United States Patent [19]
Lykowski et al.

[11] Patent Number: 6,094,990
[45] Date of Patent: Aug. 1, 2000

[54] SPARK PLUG WITH CONCENTRIC PRESSURE SENSOR

[75] Inventors: James D. Lykowski, Temperance, Mich.; Robert S. Ingham; Thomas R. Schuster, both of Toledo, Ohio

[73] Assignee: Cooper Automotive Products, Inc., Houston, Tex.

[21] Appl. No.: 09/107,123

[22] Filed: Jun. 30, 1998

[51] Int. Cl.[7] .......................... G10L 23/00; G01M 15/00
[52] U.S. Cl. ............................. 73/714; 73/35.12; 73/756
[58] Field of Search ......................... 73/714, 756, 35.01, 73/35.12, 35.13, 35.14, 115, 116, 117.2, 117.3

[56] References Cited

U.S. PATENT DOCUMENTS

| | | | |
|---|---|---|---|
| 1,861,021 | 5/1932 | Martin | 73/35.12 |
| 2,642,054 | 6/1953 | Wright | 123/169 |
| 3,020,763 | 2/1962 | Davis | 73/35.13 |
| 3,283,184 | 11/1966 | Brown | 73/35.12 |
| 3,389,287 | 6/1968 | Wolcott | 313/125 |
| 4,476,412 | 10/1984 | Nishida et al. | 313/130 |
| 4,489,596 | 12/1984 | Linder et al. | 73/116 |
| 4,494,401 | 1/1985 | Dobler et al. | 73/714 |
| 4,620,438 | 11/1986 | Howng | 73/35 |
| 4,686,861 | 8/1987 | Morii | 73/862.68 |
| 4,736,620 | 4/1988 | Adolph | 73/35.12 |
| 4,870,319 | 9/1989 | Benedikt et al. | 313/137 |
| 4,969,353 | 11/1990 | Steinke | 73/115 |
| 5,101,659 | 4/1992 | Takeuchi | 73/115 |
| 5,222,397 | 6/1993 | Kodama | 73/756 |
| 5,247,171 | 9/1993 | Wlodarczyk et al. | 250/227.21 |
| 5,275,053 | 1/1994 | Wlodarczyk et al. | 73/705 |
| 5,385,053 | 1/1995 | Wlodarczyk et al. | 73/705 |
| 5,390,546 | 2/1995 | Wlodarczyk | 73/715 |
| 5,726,351 | 3/1998 | Glaser | 73/35.12 |
| 5,747,677 | 5/1998 | Tomisawa et al. | 73/115 |
| 5,763,769 | 6/1998 | Kluzner | 73/115 |

FOREIGN PATENT DOCUMENTS

WO 97/31251  8/1997  WIPO.

OTHER PUBLICATIONS

Gang He et al., "Catheter–type Disposable Fiber Optic Pressure Transducer", presented at 9th Int'l Conf. Optical Fiber Sensors, Italy, May 1993, pp. 1–4.

Gang He et al., "Evaluation of a Spark–Plug–Integrated Fiber–Optic Combustion Pressure Sensor", SAE Technical Paper Series, Feb. 28–Mar. 3, 1994, 940381, pp. 207–214.

Gang He, et al., Fiber–optic Sensor Employing Thin–film-coating Optical Spectrum Modulation Optics Letters, vol. 18, No. 13, Jul. 1, 1993, pp. 1113–1115.

Gang He, et al., "Laboratory and In–Vehicle Evaluation of Fiber Optic Combustion Pressure Sensor", SPIE93, 1993, pp. 1–10.

(List continued on next page.)

*Primary Examiner*—George Dombroske
*Attorney, Agent, or Firm*—Fish & Richardson, P.C.

[57] ABSTRACT

A spark plug is installed in an internal combustion engine to monitor engine performance. The spark plug includes a core having a central longitudinal axis and defining a first bore extending along the central longitudinal axis. A layer of insulation surrounds the bore. A sensor is located within the bore. A first electrode is embedded in the core remote from the bore. The electrode includes a firing portion at a firing end of the spark plug. A ground electrode is arranged adjacent to the firing portion of the first electrode.

26 Claims, 3 Drawing Sheets

OTHER PUBLICATIONS

Gang He, et al., "Low–Cost Spark Plug–Integrated Fiber Optic Sensor for Combustion Pressure Monitoring", Sae Technical Paper Series, Mar. 1–Mar. 5, 1993, 930853, pp. 1–10.

Gang He, et al., "Tapered Fiber–Based Diaphragm–Type Pressure Sensor", SPIE 1993, pp. 1–8.

Kistler, Piezo–Instrumentation catalog, "Measuring Spark Plug with Integrated Cylinder Pressure Sensor", pp. 1–4 (German title).

Kistler, Piezo–Instrumentation catalog, "Spark Plug Adapter For Cylinder Pressure Sensor 6051A0,5"; pp. 1–2 (German title).

Kistler Information catalog, p. 4.

K. Kunberger, "Measuring Spark Plugs With Integrated Cylinder Pressure Sensor", Distrib & Gas Turbine Worldwide, Sep. 1994, p. 42.

R.H. Kuratle, "Measuring Spark Plugs with Integrated Cylinder Pressure Sensor", Piezo–Instrumentation KISTLER IMechE 1993, C465/019/93, pp. 1–8.

NTK, Automotive Sensors Catalog, pp. 1–2.

PCB Piezotronics, "Internal Combustion Engine Pressure Measurements", p. 5.

PCB Piezotronics, "Low Impedance Quartz Pressure Transducers Series 100", (Advertisement), catalog, p. 19 "pressure transducers series 100".

M.T. Wlodarcyzk, et al., "A Fiber–Optic Combustion Pressure Sensor System for Automotive Engine Control", Sensors, 1994, Technotes, pp. 35–42.

R.A. Wolthuis, et al., "Development of Medical Pressure and Temperature Sensors Employing Optical Spectrum Modulation", IEEE Transactions on Biomedical Engineering, vol. 38, No. 10, Oct. 1991, pp. 974–981.

SPARK PLUG WITH CONCENTRIC PRESSURE SENSOR

TECHNICAL FIELD

The invention relates to spark plugs, and, more particularly, to spark plugs having pressure sensors.

BACKGROUND

Pressure sensors have been placed in various locations relative to the cylinder chambers of internal combustion engines to monitor the pressures in the chambers during operation. For example, a shielded piezo-electric pressure sensor probe has been installed in a hole bored in the cylinder head for the purpose of holding the pressure sensor probe.

Sensors also have been integrated into spark plugs as an alternative to drilling holes in the cylinder head. For example, Lindner, U.S. Pat. No. 4,489,596, describes a spark plug arrangement having plates positioned within the spark plug. The plates include different types of sensors, such as a pressure sensor, a temperature sensor, and a gas composition sensor. Similarly, Steinke, U.S. Pat. No. 4,969,353, describes a spark plug having a bore extending through an outer portion of the spark plug so that a pressure sensor may be located within the bore. The central electrode is positioned nonconcentrically in the outer portion to provide space for accommodating the sensors.

Wlodarczyk, PCT Application No. PCT/US96/04637, describes a spark plug having a bore extending through an outer portion of the spark plug and containing a fiber optic diaphragm sensor. The diaphragm sensor may be exposed directly to the combustion gases within the engine cylinder.

SUMMARY

The invention provides a simple and economical way of monitoring the internal pressure of an engine cylinder.

In one general aspect, a spark plug may include a sensor in a central bore of an insulative core. The core has a central longitudinal axis along which the bore is defined. The core includes a layer of insulation surrounding the bore. A firing electrode may be embedded in the core remote from the bore and may have a firing portion at a firing end of the spark plug. A ground electrode may be arranged adjacent to the firing portion of the firing electrode.

Embodiments may include one or more of the following features. For example, the outer shell may define a second bore in which the core may be positioned. The ground electrode may extend from the outer shell and may be annular and arranged concentrically with respect to the core. The spark plug may also include a second firing electrode embedded in the insulation remote from the first bore and remote from the first firing electrode. Alternatively, the spark plug may include a multiplicity of firing electrodes embedded in the insulation remote from the first bore and remote from the first firing electrode.

The first bore may include a first section at a firing end of the spark plug and a second section aligned with the first section and having a larger diameter than the first section. The sensor may be located in the second section of the first bore. The first bore may be concentrically located within the spark plug. The first electrode may be a thin wire. The thin wire may have a maximum outer diameter of 0.010 inches and be made of platinum. The sensor may be a sensor configured to measure pressure. The spark plug may be configured to monitor performance of a combustion engine by installing the spark plug in a combustion cylinder of the combustion engine, connecting the sensor to a monitoring circuit, and monitoring the output of the monitoring circuit.

Other features and advantages will be apparent from the following description, including the drawings, and from the claims.

DESCRIPTION

Figure 1:
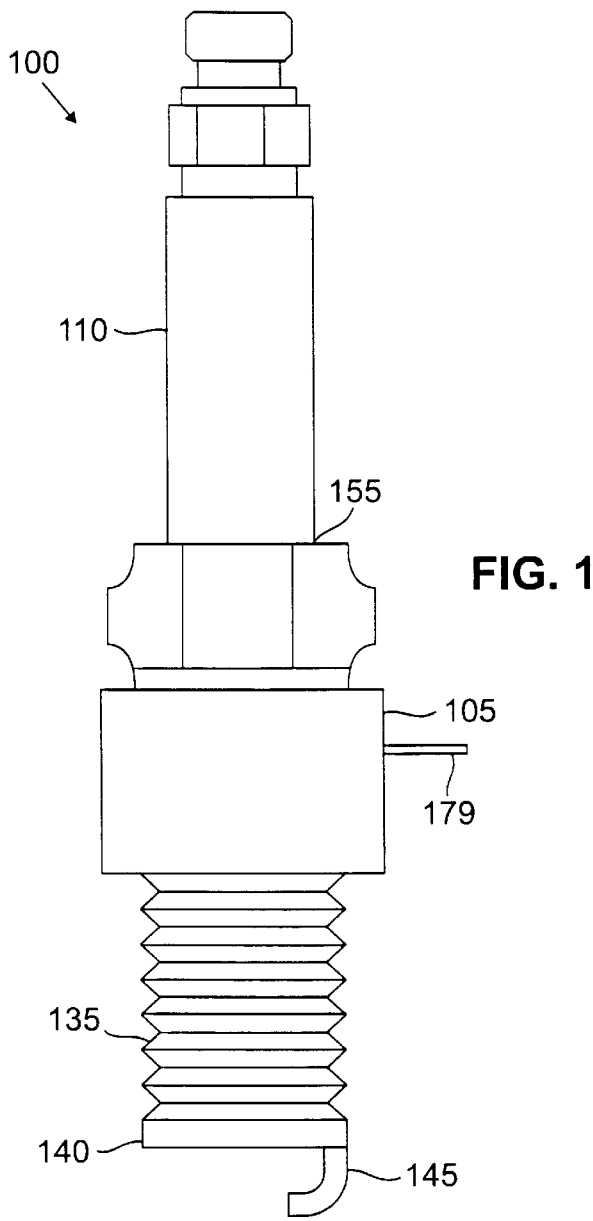
FIG. 1 is a side view of a spark plug having a pressure sensor passing through a central channel.
Figure 2:
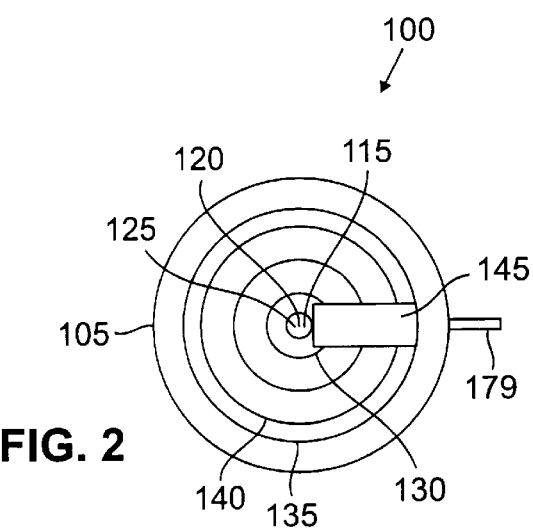
FIG. 2 is a bottom view of the spark plug of FIG. 1.
Figure 3:
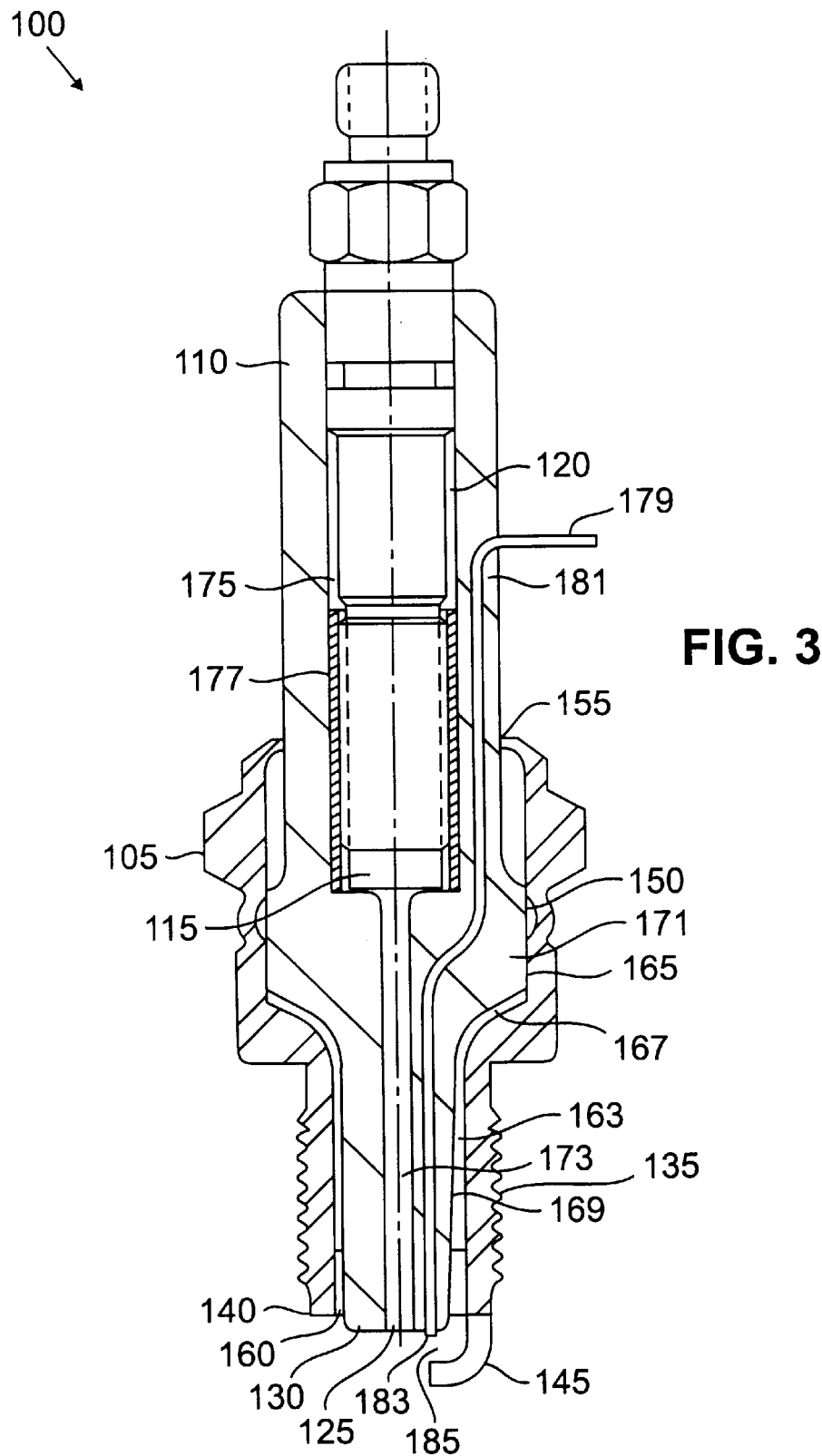
FIG. 3 is a cross-sectional side view of the spark plug of FIG. 1.

Referring to FIGS. 1–3, a spark plug 100 includes an outer shell 105 and an insulative core 110. A pressure sensor 115 is located in a central channel 120 of insulative core 110. Central channel 120 terminates at an opening 125 of an insulator core nose 130. Outer shell 105 also has a threaded length 135 for threadably mounting the spark plug within an engine (not shown). The threaded length 135 is located at an outer shell face 140 of the spark plug. A ground electrode 145 is attached to outer shell 105 at the outer shell face 140.

Outer shell 105 includes a central bore 150 that runs between an upper central opening 155 and a lower central opening 160 at outer shell face 140. Central bore 150 includes a narrow length 163 and a wider length 165. A shoulder 167, defined at the transition between narrow portion 163 and wider length 165, supports insulative core 110 when it is mounted in outer shell 105.

Insulative core 110 is inserted into central bore 150 so that a narrow length 169 corresponds to narrow length 163 and a wider length 171 corresponds to wider length 165. Central channel 120 of core 110 has a narrow length 173 that corresponds to narrow length 169 of core 110 and a wider length 175 that corresponds to wider length 171 of core 110. The wider length 175 includes a threaded section 177. The insulative core is made from an insulating material.

A fine wire 179 is embedded in the insulative wall 181 of the core 110. The wire 179 extends from the core at the firing end 140 and serves as the firing electrode 183 of the spark plug. The wire 179 may have a maximum outer diameter of 0.010 inches and be made from platinum or another material having suitable thermal and conductive properties. Firing electrode 183 and ground electrode 145 define a spark gap 185.

Pressure sensor 115 is threadably engaged in the threaded section 177 of the central channel 120. Since the central channel 120 extends to the firing end 140 of the spark plug 100, the pressure sensor 115 is able to monitor the pressure inside the firing chamber of the engine cylinder (not shown). Other implementations may include a temperature sensor, gas composition sensor, or other sensor instead of, or in addition to, the pressure sensor 115.

Figure 4:
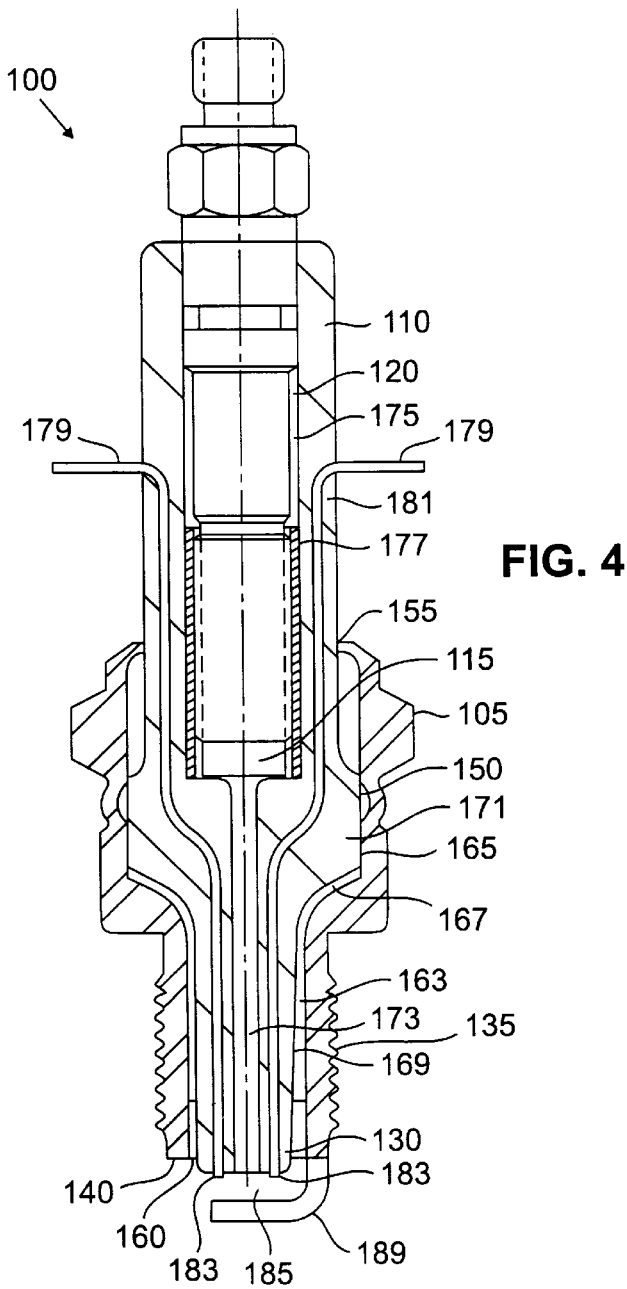
FIG. 4 is a cross-sectional side view of the spark plug of having multiple firing electrodes.
Figure 5:
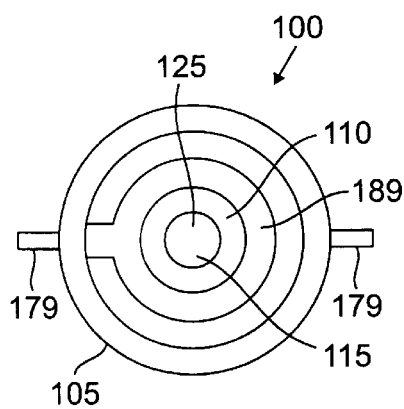
FIG. 5 is a bottom view of the spark plug of FIG. 4.

Referring to FIGS. 4 and 5, spark plug 100 may have multiple firing electrodes 183 embedded in the wall 181 of the core 110. The firing electrodes 183 may be evenly spaced around the circumference of the insulative core nose 130. In this implementation, a ground electrode 189 may be annular and arranged concentrically with respect to the core 110.

Moreover, if spark plug 100 includes only one firing electrode 183, use of an annular ground electrode eliminates any need to align the firing electrode 183 with the ground electrode 189.

Other embodiments are within the scope of the following claims.

What is claimed is:

1. A spark plug, comprising:
 a core having a central longitudinal axis and defining a bore extending along the central longitudinal axis, with a layer of insulation surrounding the bore;
 a sensor located within the bore;
 a first electrode embedded in the core remote from the bore, the electrode including a firing portion at a firing end of the spark plug; and
 a ground electrode arranged adjacent to the firing portion of the first electrode.

2. The spark plug of claim 1, further comprising an outer shell having a second central longitudinal axis and defining a second bore extending along the second central longitudinal axis, wherein the core is positioned within the second bore.

3. The spark plug of claim 2, wherein the ground electrode extends from the outer shell.

4. The spark plug of claim 3, wherein the ground electrode is an annular electrode that is arranged concentrically with respect to the core.

5. The spark plug of claim 4, further comprising a second electrode, wherein the second electrode also is embedded in the insulation remote from the first bore and remote from the first electrode.

6. The spark plug of claim 4, further comprising a multiplicity of electrodes, wherein the multiplicity of electrodes are embedded in the insulation remote from the first bore and remote from the first electrode.

7. The spark plug of claim 2, wherein the first bore includes a first section at a firing end of the spark plug and a second section aligned with the first section and having a larger diameter than the first section, and said sensor is located in the second section of the first bore.

8. The spark plug of claim 7, wherein the first bore is concentrically located within the spark plug.

9. The spark plug of claim 2, wherein the first bore is concentrically located within the spark plug.

10. The spark plug of claim 2, wherein the first electrode comprises a thin wire embedded in the core.

11. The spark plug of claim 10, wherein the thin wire has a maximum diameter of 0.010 inches.

12. The spark plug of claim 10, wherein the thin wire includes platinum.

13. The spark plug of claim 1, wherein the sensor comprises a pressure sensor.

14. A method for monitoring performance of a combustion engine, the method comprising:
 installing a spark plug with a sensor in a combustion cylinder of the engine, wherein the spark plug comprises a core having a central longitudinal axis and defining a bore extending along the central longitudinal axis, with a layer of insulation surrounding the bore, a sensor located within the bore, a first electrode embedded in the core remote from the bore, and a ground electrode arranged adjacent to the first electrode; and
 connecting the sensor to a monitoring circuit.

15. The method of claim 14, wherein the spark plug is further comprised of an outer shell having a second central longitudinal axis and defining a second bore extending along the second central longitudinal axis, and wherein the core is positioned within the second bore.

16. The method of claim 15, wherein the ground electrode extends from the outer shell.

17. The method of claim 16, wherein the ground electrode is an annular electrode that is arranged concentrically with respect to the core.

18. The method of claim 17, further comprising a second electrode, wherein the second electrode also is embedded in the insulation remote from the first bore and remote from the first electrode.

19. The method of claim 17, further comprising a multiplicity of electrodes, wherein the multiplicity of electrodes are embedded in the insulator remote from the bore and remote from the first electrode.

20. The method of claim 15, wherein the first bore includes a first section at a firing end of the spark plug and a second section aligned with the first section and having a larger diameter than the first section, and said sensor is located in the second section of the first bore.

21. The method of claim 20, wherein the first bore is concentrically located within the spark plug.

22. The method of claim 15, wherein the first bore is concentrically located within the spark plug.

23. The method of claim 15, wherein the first electrode comprises a thin wire embedded in the core.

24. The method of claim 23, wherein the thin wire has a maximum diameter of 0.010 inches.

25. The spark plug of claim 23, wherein the thin wire includes platinum.

26. The method of claim 14, wherein the sensor is a pressure sensor.

\* \* \* \* \*